(12) United States Patent
Adam

(10) Patent No.: US 9,969,301 B2
(45) Date of Patent: May 15, 2018

(54) ROTATIONAL DEVICE FOR A VEHICLE SEAT, AND VEHICLE SEAT

(71) Applicant: JOHNSON CONTROLS COMPONENTS GMBH & CO. KG, Kaiserslautern (DE)

(72) Inventor: Joerg Adam, Oberreidenbach (DE)

(73) Assignee: JOHNSON CONTROLS COMPONENTS GMBH & CO. KG, Kaiserlautern (DE)

( * ) Notice: Subject to any disclaimer, the term of this patent is extended or adjusted under 35 U.S.C. 154(b) by 89 days.

(21) Appl. No.: 15/029,919

(22) PCT Filed: Oct. 10, 2014

(86) PCT No.: PCT/EP2014/071740
§ 371 (c)(1),
(2) Date: Apr. 15, 2016

(87) PCT Pub. No.: WO2015/055524
PCT Pub. Date: Apr. 23, 2015

(65) Prior Publication Data
US 2016/0297327 A1    Oct. 13, 2016

(30) Foreign Application Priority Data

Oct. 17, 2013  (DE) ................. 10 2013 221 097
Jan. 28, 2014  (DE) ................. 10 2014 201 455

(51) Int. Cl.
*B60N 2/14*     (2006.01)
*A47C 3/18*     (2006.01)

(52) U.S. Cl.
CPC ............. *B60N 2/146* (2013.01); *A47C 3/18* (2013.01); *B60N 2/14* (2013.01)

(58) Field of Classification Search
CPC ......... A47C 1/0204; A47C 1/024; A47C 3/18; A61G 5/1062; B60N 2/14; B60N 2/146
USPC ............................ 297/354.1, 344.21
See application file for complete search history.

(56) References Cited

U.S. PATENT DOCUMENTS

| | | | |
|---|---|---|---|
| 2,822,858 A | 2/1958 | Mussler | |
| 4,436,270 A | 3/1984 | Muraishi | |
| 6,024,410 A * | 2/2000 | Yoshida | B60N 2/2358 297/301.1 |
| 8,794,704 B2 * | 8/2014 | Chen | B60N 2/22 297/354.1 |

(Continued)

FOREIGN PATENT DOCUMENTS

| | | |
|---|---|---|
| CN | 101 987 585 A | 3/2011 |
| CN | 201 761 383 U | 3/2011 |

(Continued)

*Primary Examiner* — Jose V Chen
(74) *Attorney, Agent, or Firm* — McGlew and Tuttle, P.C.

(57) ABSTRACT

A rotational device (10) for a vehicle seat includes a base element (20) and a seat part support (30) which can be rotated about a rotational axis (S) with respect to the base element (20). The rotational device (10) can be moved from a base position into a rotated position by rotating the seat part support (30) with respect to the base element (20). A catch hook (37) is provided on the base element (20) and/or on the seat part support (30). The catch hook protrudes in the radial direction over the base element (20) and/or over the seat part support (30).

20 Claims, 4 Drawing Sheets

(56) References Cited

U.S. PATENT DOCUMENTS

| | | | | |
|---|---|---|---|---|
| 2003/0062754 A1* | 4/2003 | Yamada | .................. | B60N 2/22 |
| | | | | 297/354.1 |
| 2006/0175885 A1* | 8/2006 | Syrowik | ................. | B60N 2/20 |
| | | | | 297/354.1 |
| 2012/0025579 A1* | 2/2012 | Ono | ........................ | B60N 2/68 |
| | | | | 297/354.1 |
| 2014/0008956 A1* | 1/2014 | Golarz | .................. | B60N 2/225 |
| | | | | 297/354.1 |
| 2015/0202996 A1* | 7/2015 | Kajale | ................... | B60N 2/206 |
| | | | | 297/363 |

FOREIGN PATENT DOCUMENTS

| | | |
|---|---|---|
| CN | 102 963 275 A | 3/2013 |
| DE | 4309894 A1 | 10/1993 |
| DE | 10120768 A1 | 10/2002 |
| DE | 102010053802 B3 | 5/2012 |
| DE | 102011012973 B3 | 8/2012 |
| DE | 102012017772 A1 | 3/2014 |
| EP | 0 629 268 A4 | 7/1995 |
| FR | 2486787 A1 | 1/1982 |
| FR | 2972148 A1 | 9/2012 |
| GB | 2396102 A | 6/2004 |
| JP | S5914526 A | 1/1984 |
| JP | S60125224 A | 7/1985 |
| WO | 93/18318 A1 | 9/1993 |
| WO | 2014037232 A1 | 3/2014 |

* cited by examiner

ROTATIONAL DEVICE FOR A VEHICLE SEAT, AND VEHICLE SEAT

CROSS REFERENCE TO RELATED APPLICATIONS

This application is a United States National Phase Application of International Application PCT/EP2014/071740 filed Oct. 10, 2014 and claims the benefit of priority under 35 U.S.C. § 119 of German Patent Applications 10 2013 221 097.3 filed Oct. 17, 2013 and 10 2014 201 455.7 filed Jan. 28, 2014 the entire contents of which are incorporated herein by reference.

FIELD OF THE INVENTION

The invention relates to a rotational device for a vehicle seat having a base component and a seat part support, which is rotatable about a rotation axis relative to the base component, with the rotational device being able to be brought from a basic position to a rotated position by a rotation of the seat part support relative to the base component. The invention also relates to a vehicle seat having such as rotational device.

BACKGROUND OF THE INVENTION

A rotational device of the type in question and a vehicle seat of the type in question are known from DE 10 2011 012 973 B3.

A rotational device of the type in question and a vehicle seat of the type in question are also known from DE 10 2010 053 802 B3. The vehicle seat comprises a base component and a seat part support which is rotatable relative to the base component about a rotation axis. The rotational device can be brought from a basic position to a rotated position, and vice versa, by a rotation of the seat part support relative to the base component. For crash safety, in particular to avoid the seat part support and the base component being torn apart, catch bolts are provided on the base component and, in a basic position of the rotational device, interact with recesses of the seat part support. When the rotational device is brought from a rotated position to the basic position, the recesses of the seat part support abut tangentially, when the basic position is reached, against sleeves which enclose the catch bolts of the base component. A further rotation of the seat part support beyond the basic position is not possible.

SUMMARY OF THE INVENTION

The problem addressed by the invention is that of improving a rotational device and a vehicle seat of the type mentioned at the outset, in particular that of permitting a rotation of the seat part support in both directions when the rotational device is located in the basic position.

According to the invention, a rotational device for a vehicle seat is provided comprising a base component and a seat part support which is rotatable about a rotation axis relative to the base component, said rotational device being able to be brought from a basic position to a rotated position by a rotation of the seat part support relative to the base component. A catch hook is provided on the base component and/or on the seat part support, said catch hook protruding radially, with respect to the rotation axis, beyond the base component and/or the seat part support.

By virtue of the inventive design of the rotational device, a tangential abutment for the catch hook can be omitted.

Thus, the catch hook can be rotated in both directions of rotation along the base component, when the catch hook is connected to the seat part support, or along the seat part support, when the catch hook is connected to the base component.

A rotational console according to the invention can thus be used equally for a driver's seat and for a passenger's seat, and also for right-hand drive vehicles and for left-hand drive vehicles. It is therefore unnecessary to keep a stock of rotational devices that have mirror symmetry.

With the rotational device located in the basic position, the catch hook preferably engages around the base component and the seat part support. In this way, the crash safety of the rotational device and of the vehicle seat is advantageously enhanced.

According to an advantageous embodiment of the invention, the catch hook comprises a lower limb and a base portion, said base portion being connected to the lower limb. The base portion is connected to the base component or to the seat part support and protrudes radially beyond the base component and/or the seat part support, and the lower limb extends radially toward the rotation axis. When the base portion is connected to the seat part support, the lower limb extends on that side of the base component directed away from the seat part support. When the base portion is connected to the base component, the lower limb extends on that side of the seat part support directed away from the base component.

According to another advantageous embodiment of the invention, the catch hook comprises an upper limb, a lower limb and a base portion, said base portion connecting the upper limb to the lower limb. The upper limb is in this case connected to the base component or to the seat part support, the base portion protrudes radially beyond the base component and/or the seat part support, and the lower limb extends radially toward the rotation axis. When the upper limb is connected to the seat part support, the lower limb extends on that side of the base component directed away from the upper limb. When the upper limb is connected to the base component, the lower limb extends on that side of the seat part support directed away from the upper limb.

The catch hook is preferably U-shaped, with the lower limb extending parallel to the upper limb, and with the base portion extending perpendicularly with respect to the lower limb and perpendicularly with respect to the upper limb. Thus, the catch hook is relatively easy to produce and to mount on the base component or on the seat part support.

According to an advantageous development of the invention, a slide element is mounted on the lower limb. The slide element bears on the base component or on the seat part support and thus prevents the lower limb of the catch hook from making direct contact with the base component and with the seat part support. In this way, when vibrations or other impulses occur, the creation of a disturbing noise is avoided.

The slide element is preferably made of plastic, as a result of which noise creation is avoided particularly effectively.

Particularly advantageously, the slide element has beveled side faces. This makes it easier to rotate the seat part support back in the direction of the basic position of the rotational device from a rotated position of the rotational device in which the catch hook no longer engages around the base component or the seat part support.

With the rotational device located in the basic position, the slide element is preferably located between the lower limb and the base component. In this way, the slide element is not visible and does not get in the way by protruding beyond the seat part support.

The upper limb is preferably secured on the seat part support. In this way, the lower limb extends on that side of the base component directed away from the seat part support and is therefore not visible and does not protrude and get in the way.

According to an advantageous development of the invention, at least three roller bearings are provided for the rotatable bearing of the seat part support. In this way, a more uniform distribution of pressure and distribution of force to the roller bearings is achieved, and disturbing noises caused by vibrations are avoided.

The seat part support is preferably shaped like a plate, a first roller bearing being arranged on a flat face of the seat part support, and a second roller bearing and a third roller bearing being arranged on the opposite flat face of the seat part support.

Advantageously, the roller bearings are each arranged in a circular track, wherein the first roller bearing extends at a first bearing distance circularly around the rotation axis, the second roller bearing extends at a second bearing distance circularly around the rotation axis, and the third roller bearing extends at a third bearing distance circularly around the rotation axis. The bearing distances each define a radius of the corresponding circular track.

According to another advantageous embodiment of the invention, the first bearing distance is smaller than the second bearing distance and larger than the third bearing distance. In the radial direction with respect to the rotation axis, the first roller bearing thus lies between the second roller bearing and third roller bearing. A force introduced via the first roller bearing is thus distributed to the second roller bearing and the third roller bearing.

To secure the seat part support, a locking disk is advantageously provided, which is rigidly connected to the base component. The locking disk likewise has a preferably plate-like shape. The locking disk is preferably screwed onto the base component.

The problem is also solved by a vehicle seat comprising at least one rotational device according to the invention.

The invention is explained in more detail below on the basis of an advantageous illustrative embodiment shown in the figures. However, the invention is not limited to this illustrative embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
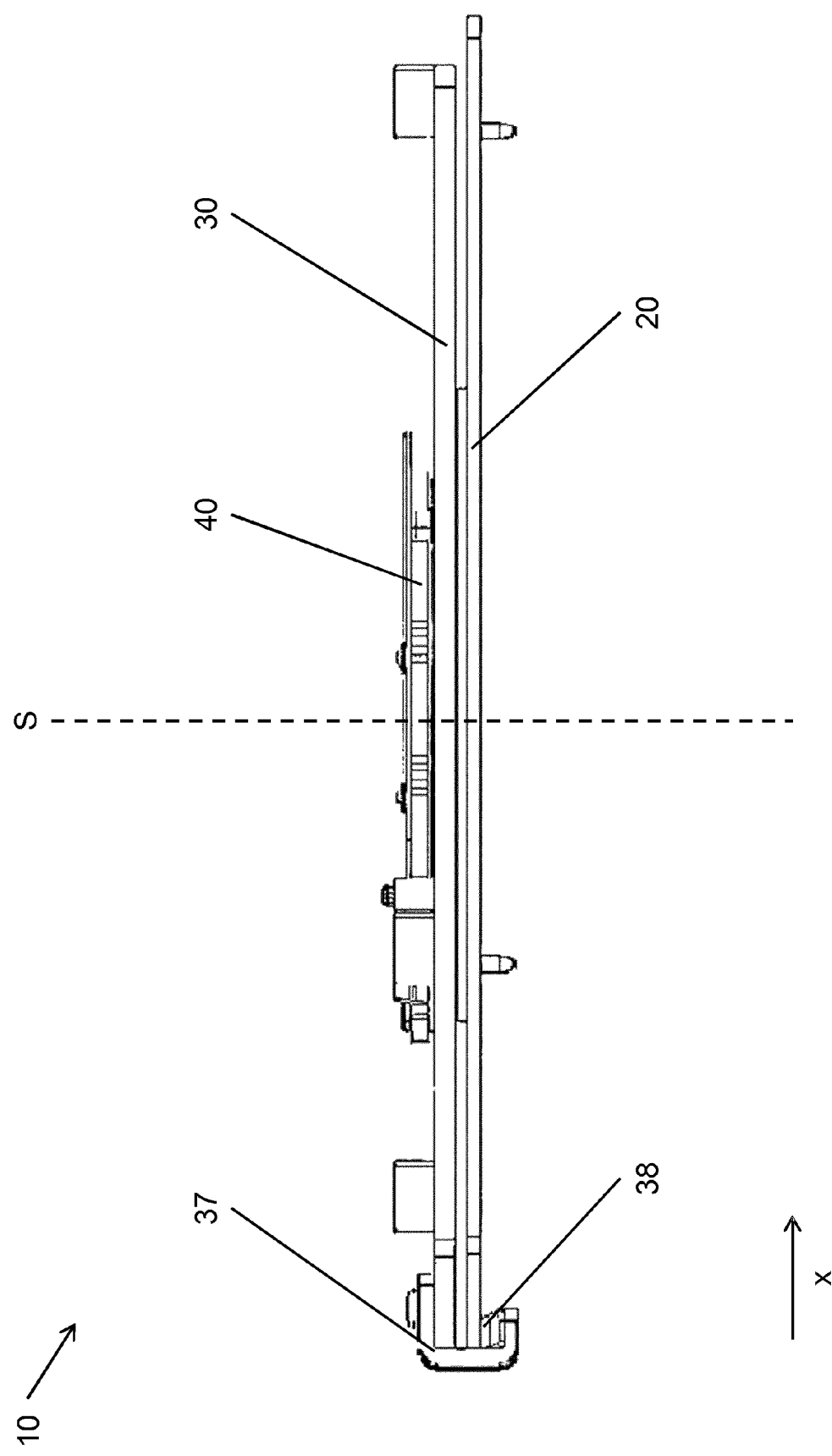
FIG. 1 is a side view of a rotational device.
Figure 2:
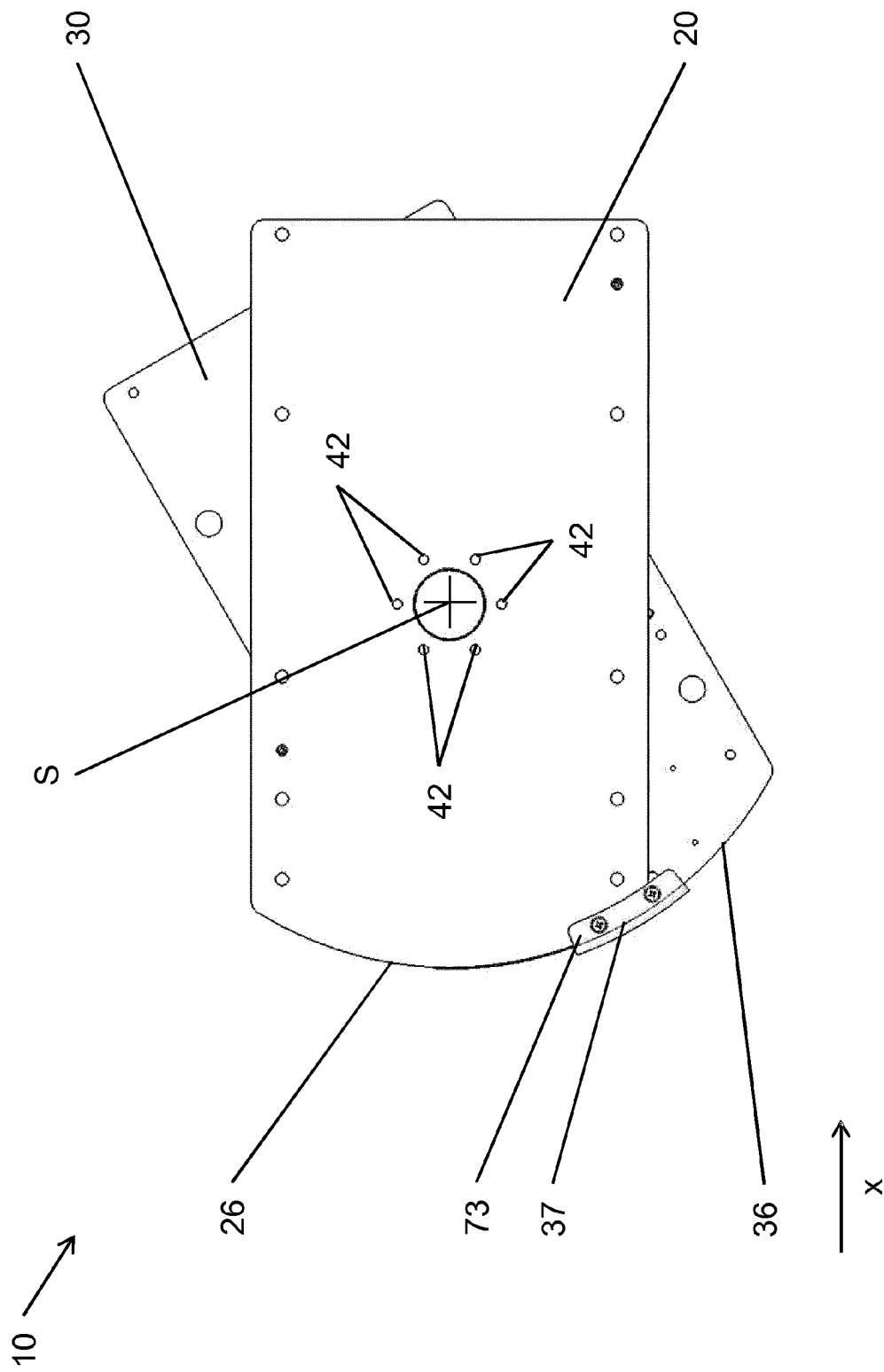
FIG. 2 is a bottom view of the rotational device according to FIG. 1 in a rotated position.
Figure 3:
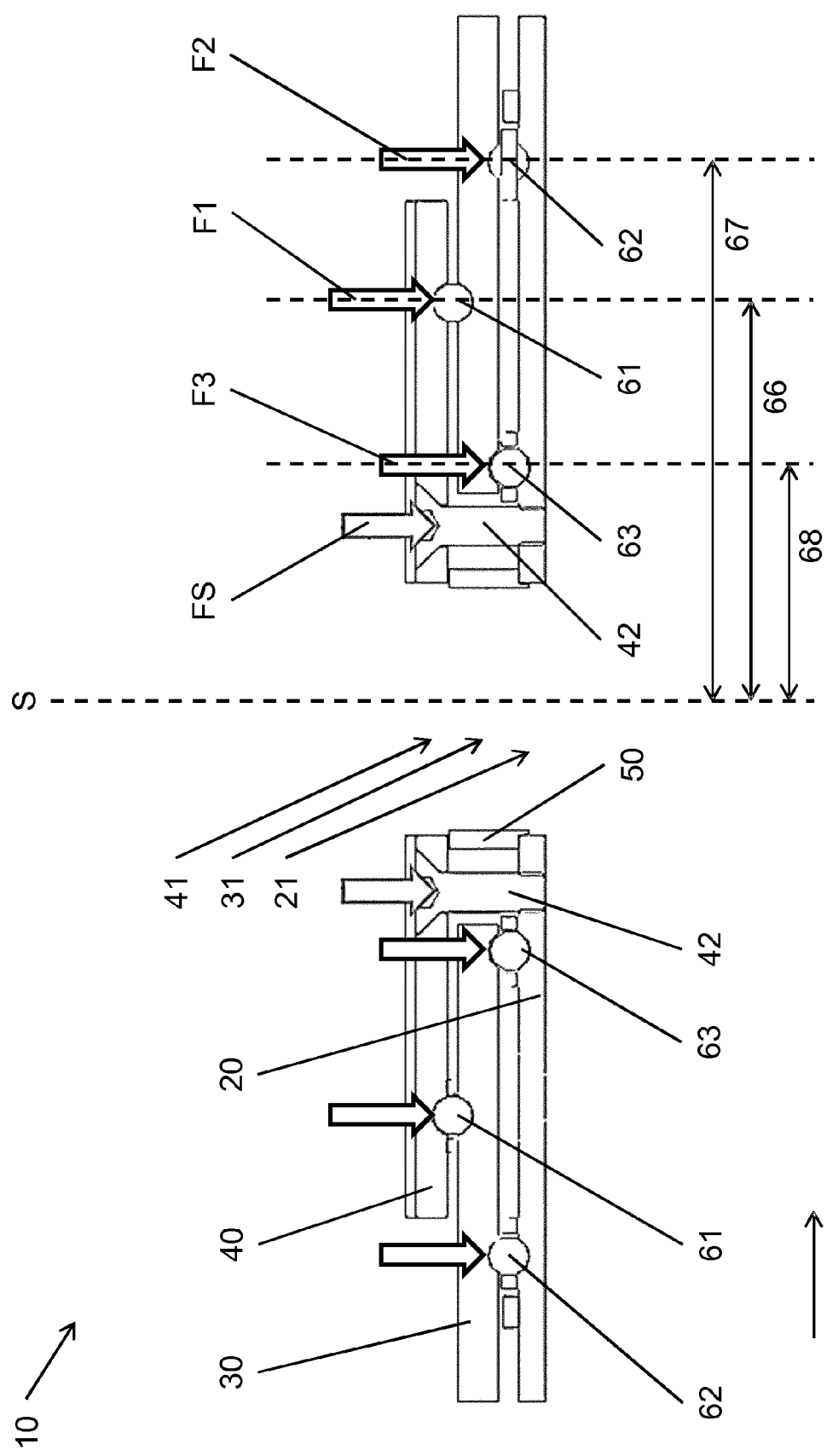
FIG. 3 is a sectional view through a central area of the rotational device according to FIG. 1.
Figure 4:
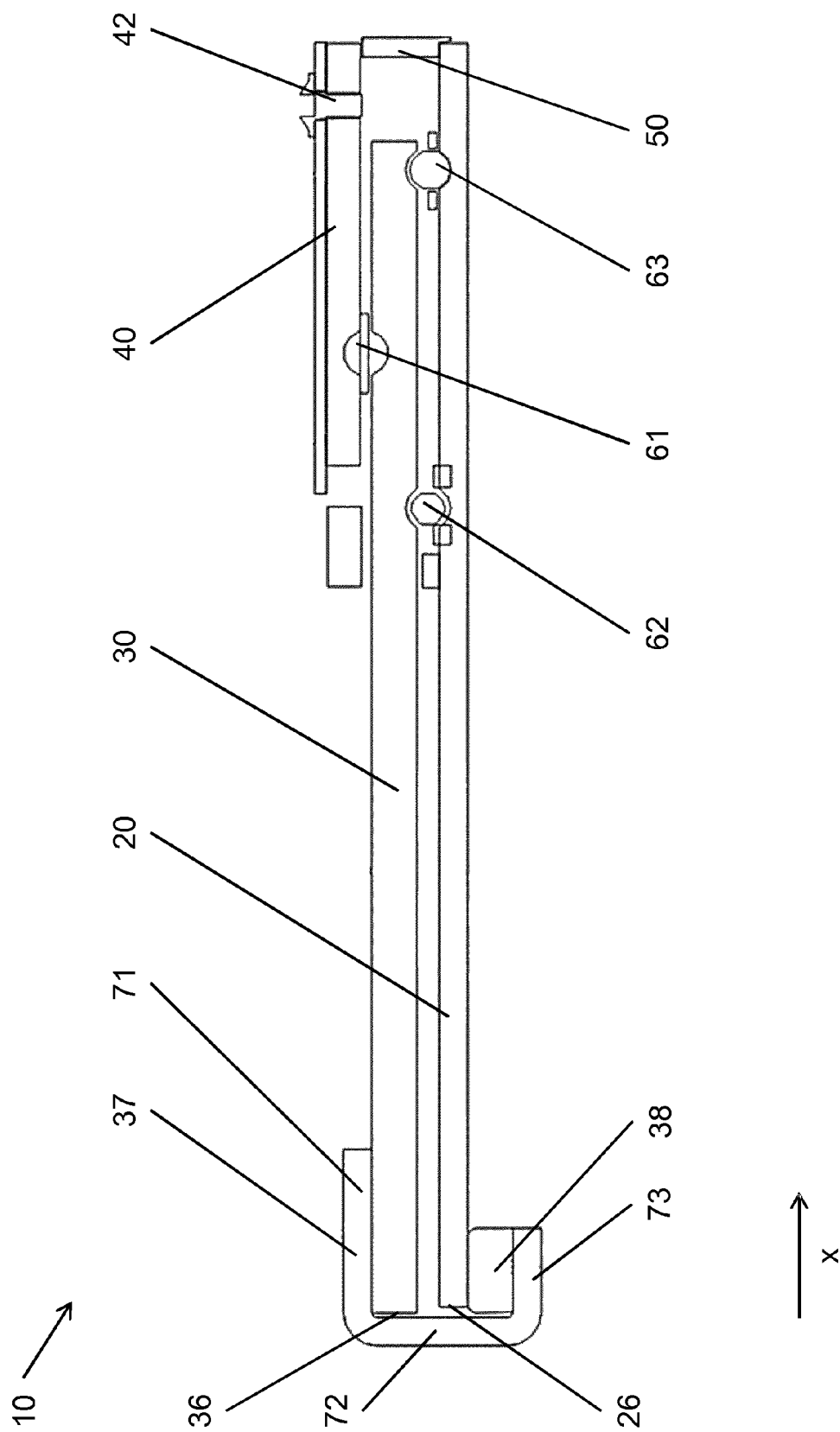
FIG. 4 is a sectional view through a side area of the rotational device according to FIG. 1.

A rotational device 10 is arranged in a vehicle (not shown here), in the present case in a utility vehicle, and supports a seat unit (not shown here). The seat unit and the rotational device 10 form a vehicle seat. The rotational device 10 is fastened, in the present case screwed, to a structure of the vehicle or to a podium-like console. In this case, the console is fastened to the floor of a passenger cell of the vehicle.

The arrangement of the vehicle seat and of the rotational device 10 inside the vehicle and the usual direction of travel x of the vehicle define the directional indicators used in the text below. A direction oriented perpendicularly with respect to the ground is designated below as the vertical direction, and a direction perpendicular to the vertical direction and perpendicular to the direction of travel x is designated below as the transverse direction.

The rotational device 10 has an approximately rectangular plate-like base component 20. A front face of the base component 20, situated to the front in the direction of travel, and lateral faces of the base component 20 are approximately rectilinear. A catch face 26 of the base component 20, situated to the rear in the direction of travel x, is designed in the shape of an arc of a circle. By means of screws (not shown), the base component 20 is screwed onto the structure of the vehicle.

The rotational device 10 likewise has an approximately rectangular plate-like seat part support 30 of approximately the same size and shape as the base component 20. The seat part support 30 is mounted on the base component 20 so as to be rotatable about a rotation axis S extending in the vertical direction. A front face of the seat part support 30, situated to the front in the direction of travel x, and lateral faces of the seat part support 30 are approximately rectilinear. A rear face 36 of the seat part support 30, situated to the rear in the direction of travel, is designed in the shape of an arc of a circle. By means of screws (not shown), the seat part support 30 is screwed onto the seat unit of the vehicle seat.

A geometric center point of the arc of the catch face 26 of the base component 20 lies on the rotation axis S. A geometric center point of the arc of the rear face 36 of the seat part support 30 likewise lies on the rotation axis S. When the rotational device 10 is located in the basic position, the seat part support 30 is oriented in the direction of travel x and the catch face 26 of the base component 20 is flush with the rear face 36 of the seat part support 30.

A circular locking disk 40 is arranged in the vertical direction above the seat part support 30 and is rigidly connected to the base component 20. The seat part support 30 thus lies, in the vertical direction, between the base component 20 and the locking disk 40.

The base component 20 has a first through-opening 21, which in the present case is designed as a circular bore. The seat part support 30 has a second through-opening 31, which in the present case is designed as a circular bore. The locking disk 40 has a third through-opening 41, which in the present case is designed as a circular bore.

The second through-opening 31 has a larger internal diameter than the first through-opening 21. The third through-opening 41 has an internal diameter of approximately the same size as the first through-opening 21. The rotation axis S extends centrally through the first through-opening 21, the second through-opening 31 and the third through-opening 41.

A locking mechanism (not shown here) is arranged on the seat part support 30 and comprises a two-armed locking lever, which is mounted rotatably about a locking axis arranged parallel to the rotation axis S. A projection is arranged on a first arm of the locking lever and, by means of a pretensioned draw spring engaged on the free end of the first arm, is loaded into a groove-shaped recess of the locking disk 40 with form-fit and force-fit engagement and, when engaged in the groove, locks the seat part support 30 is its momentary position of rotation. By acting manually on the free end of the second arm of the locking lever counter to the force of the draw spring, the projection is moved out of the groove and the locking of the seat part support 30 is canceled, as a result of which the seat part support 30 is rotatable relative to the base component about the rotation axis S.

A support ring 50 bears with a lower face on the base component 20 and passes through the second through-opening 31 coaxially with respect to the rotation axis S. The locking disk 40 bears on an upper face of the support ring 50. The external diameter of the support ring 50 is larger than the internal diameter of the first through-opening 21 and larger than the internal diameter of the third through-opening 41. The internal diameter of the support ring 50 is slightly smaller than the internal diameter of the first through-opening 21 and slightly smaller than the internal diameter of the third through-opening 41.

On its lower face bearing on the base component 20, the support ring 50 in the present case has a protruding annular shoulder which, for exact positioning of the support ring 50, protrudes into the first through-opening 21 of the base component 20. The support ring 50 can also have a protruding annular shoulder on its upper face bearing on the locking disk 40, which annular shoulder, for exact positioning of the support ring 50, protrudes into the third through-opening 41 of the locking disk 40.

The locking disk 40 is fastened to the base component 20 by means of a plurality of bearing screws 42, in the present case six bearing screws 42. The bearing screws 42 extend through through-bores provided for them in the locking disk 40 and are screwed into threaded bores of the base component 20.

The bearing screws 42 are arranged on a circumferential line of a circle whose center point lies on the rotation axis S, and they are distributed uniformly on the circumferential line of the circle. The bearing screws 42 are thus arranged at the same distance from the rotation axis S, this distance being greater that the outer radius of the support ring 50 but smaller than the inner radius of the second through-opening 31. The bearing screws 42 are thus located radially between the support ring 50 and the seat part support 30 with respect to the rotation axis S.

A first roller bearing 61 is arranged in the vertical direction between the locking disk 40 and the seat part support 30. The first roller bearing 61 extends circularly around the rotation axis S and is arranged, in the radial direction, at a first bearing distance 66 from the rotation axis S.

A second roller bearing 62 is arranged in the vertical direction between the seat part support 30 and the base component 20. The second roller bearing 62 extends circularly around the rotation axis S and is arranged, in the radial direction, at a second bearing distance 67 from the rotation axis S.

A third roller bearing 63 is arranged in the vertical direction between the seat part support 30 and the base component 20. The third roller bearing 63 extends circularly around the rotation axis S and is arranged, in the radial direction, at a third bearing distance 68 from the rotation axis S.

The second bearing distance 67 is greater than the first bearing distance 66, which is greater than the third bearing distance 68. The third bearing distance 68 is also greater than the inner radius of the second through-opening 31.

By means of the roller bearings 61, 62, 63, which in the present case are designed as ball bearings, the seat part support 30 is supported between the base component 20 and the locking disk 40 and is mounted rotatably about the rotation axis S relative to the base component 20 and to the locking disk 40. For this purpose, the roller bearings 61, 62, 63 have suitable ball raceways and balls.

When the bearing screws 42 are screwed fast with a tightening torque, they exert a tightening force FS, which draws the locking disk 40 and the base component 20 toward each other and thus braces the locking disk 40 against the base component 20.

On account of the tightening force FS of the bearing screws 42, the locking disk 40 presses with a first bearing force F1 on the first roller bearing 61, which in turn presses with the first bearing force F1 on the seat part support 30.

The direction of action of the first bearing force F1 depends on the configuration of the ball raceways of the first roller bearing 61. In the present case, the first bearing force F1 acts in the vertical direction. However, the first bearing force F1 can also have a component in the vertical direction and a component in the radial direction with respect to the rotation axis S.

The seat part support 30 presses with a second bearing force F2 on the second roller bearing 62 and with a third bearing force F3 on the third roller bearing 63. The second roller bearing 62 in turn presses with the second bearing force F2 on the base component 20, and the third roller bearing 63 in turn presses with the third bearing force F3 on the base component 20.

The directions of action of the second bearing force F2 and of the third bearing force F3 depend on the configurations of the ball raceways of the second roller bearing 62 and of the third roller bearing 63. In the present case, the second bearing force F2 and the third bearing force F3 each act in the vertical direction. The second bearing force F2 and the third bearing force F3 can also each have a component in the vertical direction and a component in the radial direction with respect to the rotation axis S.

The ratio of the second bearing force F2 to the third bearing force 63 can be chosen by suitable choice of the first bearing distance 66 in relation to the second bearing distance 67 and to the third bearing distance 68.

In particular, the ratio of the vertically acting component of the second bearing force F2 to the vertically acting component of the third bearing force F3 can be chosen by suitable choice of the first bearing distance 66 in relation to the second bearing distance 67 and to the third bearing distance 68.

By reducing the difference between the first bearing distance 66 and the second bearing distance 67, while at the same time increasing the difference between the first bearing distance 66 and the third bearing distance 68, the vertically acting component of the second bearing force F2 is increased, and the vertically acting component of the third bearing force F3 is reduced. By reducing the difference between the first bearing distance 66 and the third bearing distance 68, while at the same time increasing the difference between the first bearing distance 66 and the second bearing distance 67, the vertically acting component of the second bearing force F2 is reduced, and the vertically acting component of the third bearing force F3 is increased.

In the present case, the first bearing distance 66 is chosen in relation to the second bearing distance 67 and to the third bearing distance 68 in such a way that the vertically acting component of the second bearing force F2 and also the vertically acting component of the third bearing force F3 always have a sufficient magnitude. This avoids a situation where vibrations or oscillations acting on the rotational device 10 cause the seat part support 30 to be deflected in the vertical direction or to be bent in such a way that balls of the second roller bearing 62 or balls of the third roller bearing 63 lose contact with the seat part support 30 and/or the base component 20.

A catch hook 37 is mounted in a central area of the rear face 36 of the seat part support 30. The catch hook 37 is U-shaped, with an upper limb 71 of the catch hook 37 extending horizontally, bearing in the vertical direction on the seat part support 30 and being rigidly connected, in the present case screwed, onto the latter. Alternatively, the catch hook 37 can also be welded onto the seat part support 30.

A base portion 72 of the catch hook 37, which is located behind the seat part support 30 in the direction of travel x, extends from the upper limb 71 of the catch hook 37 downward in the vertical direction to a point below the base component 20. In the basic position of the rotational device 10, a lower limb 73 of the catch hook 37 extends forward from the base portion 72 of the catch hook 37 in the direction of travel and, parallel to the upper limb 71 of the catch hook 37, under the base component 20.

Thus, in the vertical direction, the catch hook 37 engages around the base component 20 and the seat part support 30. A slide element 38, which in the present case is made of plastic, is mounted on the lower limb 73 of the catch hook 37, on the side facing toward the upper limb 71. When the rotational device 10 is located in the basic position, the slide element 38 is located in the vertical direction between the lower limb 73 of the catch hook 37 and the base component 20 and bears on the base component 20.

When the rotational device 10 is located in the basic position, the slide element 38 prevents the catch hook 37 from directly touching the base component 20. In the event of vibrations or oscillations, this therefore avoids the creation of disturbing noise.

The catch hook 37 also constitutes a crash safeguard for the rotational device 10, in particular in the event of a head-on collision. In the event of a crash, the catch hook 37 prevents the seat part support 30 and the base component 20 from being torn apart.

When the seat part support 30, having been unlocked, is rotated from the basic position about the rotation axis S relative to the base component 20, the catch hook 37 moves with the slide element 38 along the catch face 26 of the base component 20. The catch hook 37 engages around the base component 20 as far as a rotation of in the present case approximately 30° from the basic position. Starting from a rotation of in this case more than 30° from the basic position, the catch hook 37 withdraws from the base component 20.

The slide element 38 has beveled side faces. When the seat part support 30 is rotated back to the basic position from a position in which it has been rotated beyond 30°, the beveled side faces of the slide element 38 facilitate the insertion of the base component 20 into the catch hook 37.

The features disclosed in the above description, in the claims and in the drawings may be of significance both individually and also in combination with one another for the implementation of the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A rotational device for a vehicle seat, the rotational device comprising:
   a base component;
   a seat part support which is rotatable about a rotation axis relative to the base component, said rotational device being rotatable from a basic position to a rotated position by a rotation of the seat part support relative to the base component; and
   a catch hook on at least one of the base component or on the seat part support, said catch hook protruding radially relative to the rotation axis beyond the base component and the seat part support, said catch hook engages around the base component and the seat part support when said rotational device is in the basic position.

2. The rotational device as claimed in claim 1, wherein the catch hook comprises an upper limb, a lower limb and a base portion, said base portion connecting the upper limb to the lower limb.

3. The rotational device as claimed in claim 2, wherein the catch hook is U-shaped, with the lower limb extending parallel to the upper limb, and with the base portion extending perpendicularly with respect to the lower limb and perpendicularly with respect to the upper limb.

4. The rotational device as claimed in claim 2, further comprising a slide element mounted on the lower limb.

5. The rotational device as claimed in claim 4, wherein the slide element is made of plastic.

6. The rotational device as claimed in claim 4, wherein the slide element has beveled side faces.

7. The rotational device as claimed in claim 4, wherein, with the rotational device located in the basic position, the slide element is located between the lower limb and the base component.

8. The rotational device as claimed in claim 2, wherein the upper limb is secured on the seat part support.

9. The rotational device as claimed in claim 1, further comprising at least three roller bearings for a rotatable bearing of the seat part support.

10. The rotational device as claimed in claim 9, wherein the seat part support is shaped like a plate, a first roller bearing, of the at least three roller bearings, being arranged on a flat face of the seat part support, and a second roller bearing, of the at least three roller bearings, and a third roller bearing, of the at least three roller bearings, being arranged on the opposite flat face of the seat part support.

11. The rotational device as claimed in claim 10, wherein the first roller bearing extends at a first bearing distance circularly around the rotation axis, and the second roller bearing extends at a second bearing distance circularly around the rotation axis, and the third roller bearing extends at a third bearing distance circularly around the rotation axis.

12. The rotational device as claimed in claim 11, wherein the first bearing distance is smaller than the second bearing distance, and the first bearing distance is larger than the third bearing distance.

13. The rotational device as claimed in claim 9, further comprising a locking disk rigidly connected to the base component.

14. The rotational device as claimed in claim 1, wherein:
   said catch hook and said seat part support are arranged for said catch hook to engage around said base component and said seat part support when said rotational device is within 30° from the basic position.

15. A vehicle seat, comprising at least one rotational device comprising:

a base component;

a seat part support which is rotatable about a rotation axis relative to the base component, said rotational device being rotatable from a basic position to a rotated position by a rotation of the seat part support relative to the base component; and a catch hook at least one of on the base component and/or on the seat part support, said catch hook protruding radially relative to the rotation axis beyond the base component and the seat part support, said catch hook engages around the base component and the seat part support when said rotational device is in the basic position.

16. The rotational device as claimed in claim 15, wherein the catch hook comprises an upper limb, a lower limb and a base portion, said base portion, connecting the upper limb to the lower limb.

17. The rotational device as claimed in claim 16, wherein the catch hook is U-shaped, with the lower limb extending parallel to the upper limb, and with the base portion extending perpendicularly with respect to the lower limb and perpendicularly with respect to the upper limb.

18. The rotational device as claimed in claim 16, further comprising a slide element mounted on the lower limb.

19. The rotational device as claimed in claim 15, further comprising at least three roller bearings for a rotatable bearing of the seat part support, wherein the seat part support is shaped like a plate, a first roller bearing, of the at least three roller bearings, being arranged on a flat face of the seat part support, and a second roller bearing, of the at least three roller bearings, and a third roller bearing, of the at least three roller bearings, being arranged on the opposite flat face of the seat part support.

20. The rotational device as claimed in claim 15, wherein:

said catch hook and said seat part support are arranged for said catch hook to engage around said base component and said seat part support when said rotational device is within 30° from the basic position.

* * * * *